United States Patent Office 3,344,506
Patented Oct. 3, 1967

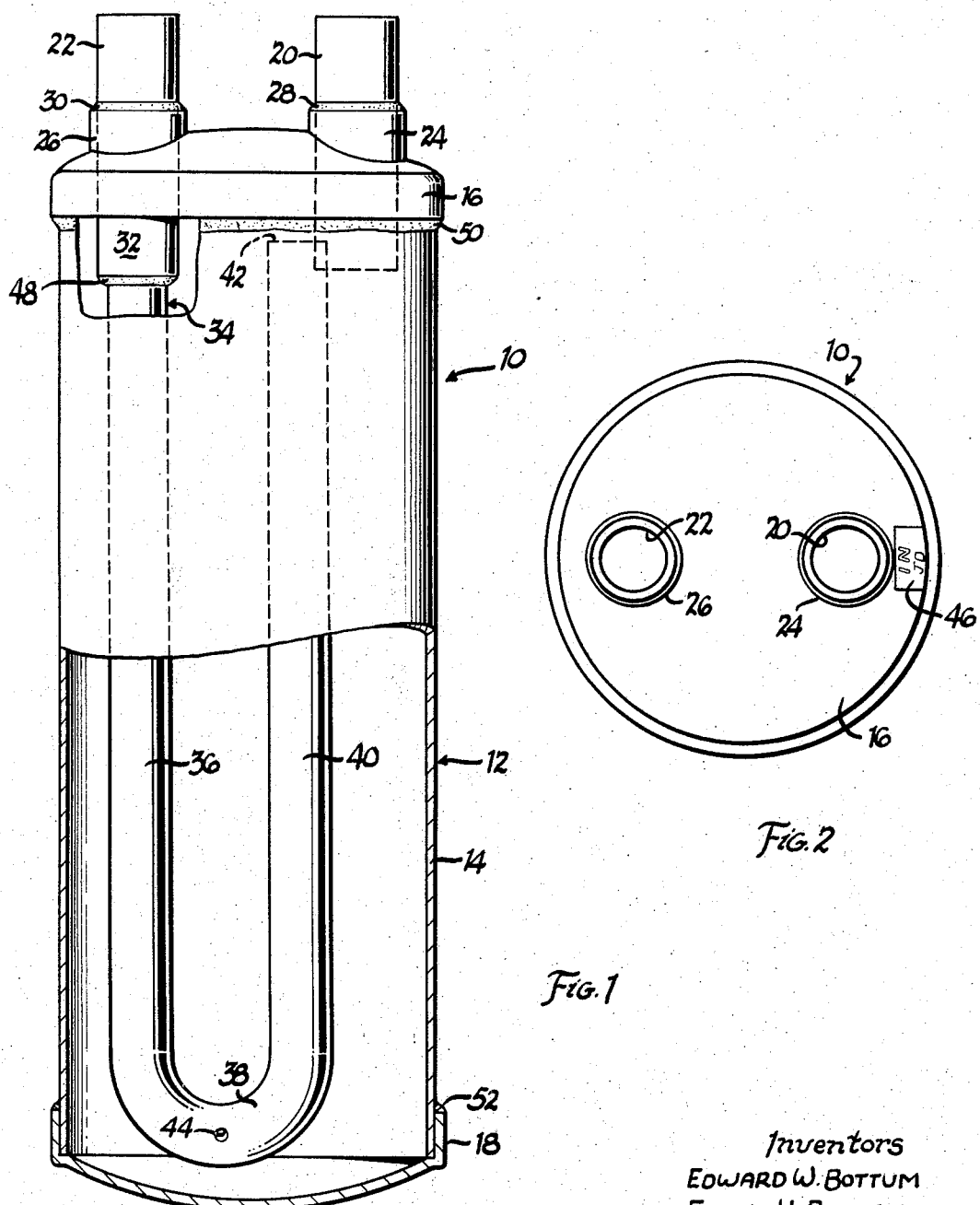

3,344,506
METHOD OF MANUFACTURE OF A SUCTION ACCUMULATOR
Edward W. Bottum and Frank H. Rockwell, Brighton, Mich., assignors to Refrigeration Research, Incorporated, Brighton, Mich., a corporation of Michigan
Filed July 26, 1965, Ser. No. 474,555
5 Claims. (Cl. 29—407)

The present invention relates to a method of manufacturing a suction accumulator, and more particularly to a method for manufacturing a suction accumulator which insures proper connection of an inlet tube and an outlet tube having visually similar external projections.

The suction accumulator to which the present invention pertains is particularly adapted for use in refrigeration systems which are operated intermittently, such as heat pumps, air conditioning systems and other commercial refrigeration systems. The suction accumulator is provided between the evaporator and compressor of a refrigeration system. Vaporized refrigerant is received from the evaporator and passed on through the accumulator to the compressor. Liquids such as refrigerant and lubricating oil, are collected in the accumulator and slowly metered to the compressor. This metering protects the compressor against undue shock resulting from the sudden injection of large amounts of liquid thereinto. Such shocks frequently result in broken valves, rods and the like. Also this metering prevents liquid refrigerant from forcing the oil out of the bearing. This causes the bearings and compressor motor to burn out.

A problem has been experienced with suction accumulators in that it has been difficult to identify accurately the inlet tube and the outlet tube. These tubes project in a symmetrical fashion from the accumulator and are visually similar so that it is difficult to determine externally which tube is which unless the tubes are marked. Once the accumulator is assembled, it cannot be taken apart and thus the interior of the unit is not accessible to determine which tube is which by an examination of the interior connections.

The present invention solves this problem by providing a permanent marking for one of the tubes to distinguish the tubes, this marking being provided at the point in the manufacture of the accumulator at which the connections are inspected and permanently marked by the inspector to insure that the connections are proper.

It is, therefore, an object of the invention to provide a method of manufacturing a suction accumulator which has inlet and outlet tubes projecting therefrom in a symmetrical fashion, the method insuring that the inlet and outlet tubes will be properly marked so as to prevent subsequent incorrect connection of the accumulator into a refrigeration system.

Another object of the invention is to provide such a method which is performed at an intermediate stage of manufacture of the accumulator and which permits marking by an inspector to indicate that the unit has been inspected and that the marking is proper.

Another object of the invention is to provide means for recording inspection of a metering orifice within the accumulator to certify that the metering orifice is of the correct size.

A further object of the invention is to provide a plate secured to the accumulator to identify the inlet and outlet tubes, the plate being of a metal permitting impression thereon of a permanent inspection mark.

Other objects of this invention will appear in the following description and appended claims, reference being had to the accompanying drawings forming a part of this specification wherein like reference characters designate corresponding parts in the several views.

In the drawings:
FIGURE 1 is an elevational view of a suction accumulator manufactured in accordance with the present invention with parts broken away for the purpose of clarity; and
FIGURE 2 is a top plan view of the suction accumulator of FIGURE 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

The drawing illustrates a suction accumulator 10 which is manufactured in accordance with the method of the present invention. The suction accumulator 10 includes a casing 12 which comprises an open ended tube 14 having an upper end closure 16 and a lower end closure 18 secured thereto.

An inlet tube 20 extends through the upper end closure 16. The tube 20 terminates in the upper portion of the casing 12. An outlet tube 22 is positioned adjacent the inlet tube 20 and also extends through the upper end closure 16. The tubes 20, 22 are received in openings defined by tubular projections 24, 26 provided in the upper end closure 16. The projections 24, 26 support the tubes 20, 22. Tubes 20, 22 are secured in place in fluid-tight fashion as by hydrogen-copper brazing indicated at 28, 30.

It will be noted in FIGURE 2 that the projections 24, 26 and tubes 20, 22 have substantially the same diameter. The projections 24, 26 are arranged symmetrically around the center of the upper end closure 16. As noted in FIGURE 1, the length of the portion of the tubes 20, 22 extending out of the end closure is about the same. As a consequence, it will be appreciated that without some means for identifying which tube is the inlet tube and which tube is the outlet tube, it would be difficult to determine which tube is which. The same problem is also encountered when the tubes project in a symmetrical fashion about an axis of the casing as from one side of the casing, from opposite sides of the casing or from the opposite end of the casing.

Referring to the interior of the casing 12, it will be noted that the inner end 32 of the tube 22 is of reduced diameter and receives one end of a metering tube 34 which is configured as a U-tube. One leg 36 of the tube 34 extends from the outlet tube 22 downwardly to a point adjacent the lower end closure 18. The tube is then provided with a bend 38 and the second leg 40 extends upwardly and terminates in an open end 42 adjacent the upper end closure 16.

A small metering opening 44 is provided in the tube bend 38. The size of the metering opening 44 will vary depending upon the capacity of the particular accumulator.

In operation of the accumulator, cold refrigerant gas, having a small amount of entrained liquid refrigerant and oil therein, enters through the tube 20 into the accumulator. The refrigerant gas is drawn into the open end 42 of the U-tube 34, passes through both legs of the U-tube and exits through the outlet tube 22 and thence to the compressor. The compressor, which creates a suction, draws the gaseous refrigerant through the accumulator at a relatively rapid rate.

If an unusually large amount of liquid refrigerant and oil enters the accumulator through the tube 20, it will drop to the bottom of the accumulator and will be subsequently drawn through the metering opening 44 and thence through the leg 40 into the compressor. The opening 44 acts as a restriction and causes the liquid refrigerant to be metered into the compressor at a controlled rate. The accumulator thus acts to prevent large amounts of liquid refrigerant and oil to suddenly enter the compressor. Such sudden surges of liquid often result in seriously damaging the compressor.

In accordance with the present invention, the upper end closure 16, inlet tube 20, outlet tube 22 and U-tube 34 are first assembled and secured in place as by brazing. A small metal plate 46 is secured to the top end closure 16 as by spot welding. The plate 46 has stamped thereon the word "in." Consequently, the inlet tube 20 is placed in the projection 24 and secured in place by brazing as at 28. The outlet tube 14 is received in the projection 26 and brazed in place as at 30. The U-tube is received in the inner end of the outlet tube 22 and brazed in place as at 48. It will be appreciated, of course, that the various tubes are assembled with the upper end closure 16 at the same time and the entire assembly brazed simultaneously.

After the above-described assembly has been brazed, it is inspected by an inspector. The inspector checks the inlet and outlet tubes and U-tube to be sure that these tubes are properly located with respect to the plate 46. The inspector also inspects the metering opening 44 to be sure that this opening is of the proper size for the unit being assembled. If the assembly has been correctly put together, the inspector stamps a symbol, in this case, indicated as the initials "JD" to indicate that the inlet has been inspected and is correctly assembled.

The accumulator is then finally assembled by placing the upper end closure 16 onto one end of the casing 12 and placing the lower end closure 18 onto the other end and brazing the end closures in place as at 50, 52.

After the accumulator has been completely assembled and all the joints sealed, it is very easy for the final inspector to determine that a preliminary inspection has been made and that everything inside the accumulator is correct and that the external connections are properly identified. It should be noted that the external connections may both be identified, if desired, or, alternately, that the "out" connection is identified rather than the "in" connection.

Having thus described our invention, we claim:

1. A method of manufacturing a suction accumulator comprising a casing including an open ended tube having an upper end closure and a lower end closure, an inlet opening and an outlet opening in the upper end closure, an inlet tube and an outlet tube extending through the upper end closure, a U-tube within the casing, one end of said U-tube extending from the outlet tube and the other end thereof being open, and a metering opening in the bend of the U-tube, comprising the steps of securing a plate on the exterior surface of the upper end closure, said plate having indicia thereon to identify at least one of the inlet opening and outlet opening, assembling the inlet tube, outlet tube, U-tube and upper end closure, permanently sealing the junctures of said assembled components to secure the components together in fluid-tight relationship, inspecting said assembled components to ascertain that the various tubes have been properly connected and that said metering opening is of the proper size, marking said plate with indicia to indicate that said inspection has been made, and then assembling the upper end closure and attached components, the open ended tube and the lower end closure and permanently sealing the junctures of said tube with said end closures to secure said components together in fluid-tight relationship.

2. A method of manufacturing a suction accumulator comprising a casing including an open ended tube having an upper end closure and a lower end closure, an inlet opening and an outlet opening in the upper end closure, an inlet tube and an outlet tube extending through the respective openings in the upper end closure, a U-tube within the casing, one end of said U-tube extending from the outlet tube and the other end thereof being open, and a metering opening in the bend of the U-tube, comprising the steps of providing a plate on the exterior surface of the upper end closure, said plate having indicia thereon to identify at least one of the inlet opening and outlet opening, assembling the inlet tube, outlet tube, U-tube and upper end closure, brazing the junctures of said assembled components to secure the components together in fluid-tight relationship, inspecting said assembled components to ascertain that the various tubes have been properly connected and that said metering opening is of the proper size, marking said plate with indicia to indicate that said inspection has been made, and then assembling the upper end closure and attached components, the open ended tube and the lower end closure, and brazing the junctures of said tube with said end closures to secure said components together in fluid-tight relationship.

3. A method of manufacturing a suction accumulator comprising a casing including an open ended tube having an upper end closure and a lower end closure, an inlet opening and an outlet opening in the upper end closure, an inlet tube and an outlet tube extending through the respective openings in the upper end closure, a U-tube within the casing, one end of said U-tube extending from the outlet tube and the other end thereof being open, and a metering opening in the bend of the U-tube, comprising the steps of first assembling the inlet tube, outlet tube, U-tube and upper end closure, brazing the junctures of said assembled components to secure the components together in fluid-tight relationship, then inspecting said assembled components to ascertain that the various tubes have been properly connected and that said metering opening is of the proper size, then securing a plate on the exterior surface of the upper end closure, said plate having indicia thereon to identify at least one of the inlet opening and outlet opening, marking said plate with indicia to indicate that said inspection has been made, and then assembling the upper end closure and attached components, the open ended tube and the lower end closure, and brazing the junctures of said open ended tube with said end closures to secure said components together in fluid-tight relationship.

4. A method of manufacturing a suction accumulator comprising a casing including an open ended tube having an upper end closure and a lower end closure, an inlet opening and an outlet opening in the casing, an inlet tube extending through the inlet opening and an outlet tube extending through the outlet opening, a metering tube within the casing, one end of said metering tube extending from the outlet tube and the other end thereof being open, and a metering opening in the metering tube, comprising the steps of securing a plate on the exterior surface of the casing adjacent one of said openings, said plate having indicia thereon to identify at least one of the inlet opening and outlet opening, assembling the inlet tube and outlet tube, in their respective openings and the metering tube to the outlet tube, permanently sealing the junctures of said assembled components to secure the components together in fluid-tight relationship, inspecting said assembled components to ascertain that the various tubes have been properly connected and that said metering opening is of the proper size, marking said plate with indicia to indicate that said inspection has been made, and then assembling the remaining components of the suction accumulator, and permanently sealing the junctures of said components together in fluid-tight relationship.

5. A method of manufacturing a suction accumulator comprising a casing including an open ended tube having an upper and closure and a lower end closure, an inlet opening and an outlet opening in the casing, an inlet tube extending through the inlet opening and an outlet tube extending through the outlet opening, a metering tube within the casing, one end of said metering tube extending from the outlet tube and the other end thereof being open, and a metering opening in the metering tube, comprising the steps of forming the inlet opening and the outlet opening in the casing substantially symmetrically about at least one axis of the casing, securing a plate on the exterior surface of the casing adjacent one of said openings, providing indicia on the plate to identify at least one of the inlet opening and outlet opening, assembling the inlet tube and outlet tube in their respective openings and assembling the metering tube to the outlet tube, permanently sealing the junctures of said assembled components to secure the components together in fluid-tight relationship, inspecting said assembled components to ascertain that the various tubes have been properly connected and that said metering opening is of the proper size, marking said plate with indicia to indicate that said inspection has been made, and then assembling the remaining components of the suction accumulator, and finally permanently sealing the junctures of said components together in fluid-tight relationship.

References Cited
UNITED STATES PATENTS

| | | | |
|---|---|---|---|
| 2,885,773 | 5/1959 | Molinaro | 29—407 |
| 2,920,384 | 1/1960 | Fasoli et al. | 29—407 |

JOHN F. CAMPBELL, *Primary Examiner.*

THOMAS H. EAGER, *Examiner.*